US005380386A

United States Patent [19]

Oldham et al.

[11] Patent Number: 5,380,386

[45] Date of Patent: Jan. 10, 1995

[54] MOLDED METALLIZED PLASTIC MICROWAVE COMPONENTS AND PROCESSES FOR MANUFACTURE

[75] Inventors: Susan L. Oldham, Torrance; Martha J. Harvey, Valencia; Steve K. Panaretos, Los Angeles; John L. Fugatt, Hermosa Beach; Richard L. Ducharme; Jeffrey M. Bille, both of Torrance; Douglas O. Klebe, Los Angeles, all of Calif.

[73] Assignee: Hughes Aircraft Company, Los Angeles, Calif.

[21] Appl. No.: 243,605

[22] Filed: May 16, 1994

Related U.S. Application Data

[63] Continuation of Ser. No. 880,122, May 7, 1992, abandoned.

[51] Int. Cl.[6] .............................................. B32B 31/14

[52] U.S. Cl. .................................... 156/150; 156/153; 156/242; 156/245; 156/292; 257/659; 333/239; 333/248; 343/731; 343/772; 385/50; 385/129; 385/142; 385/144

[58] Field of Search ............... 156/242, 245, 292, 150, 156/244.11, 153; 257/659; 333/239, 248; 343/731, 755, 772, 775, 779, 783, 771, 872; 385/50, 129, 132, 142, 143, 144, 145

[56] References Cited

U.S. PATENT DOCUMENTS

| | | | |
|---|---|---|---|
| 3,982,215 | 9/1976 | Lo et al. | 333/239 |
| 4,020,875 | 5/1977 | Akiba | 333/239 |
| 5,091,036 | 2/1992 | Taylor | 264/136 |
| 5,185,654 | 2/1993 | Mosher et al. | 257/659 |

*Primary Examiner*—Caleb Weston

*Attorney, Agent, or Firm*—Leonard A. Alkov; W. K. Denson-Low

[57] ABSTRACT

A method of fabricating a microwave waveguide component wherein a plurality of joinable thermoplastic members are first formed. The members, when joined, comprise a microwave waveguide component having an internal surface that is adapted to be plated. The thermoplastic members are then bonded together. Then, the internal surface is plated to form the finished microwave waveguide component. The present method forms microwave components from plated, injection molded thermoplastic and reaction injection molded thermosetting plastics. In particular, the plastic components made using the present invention exhibit comparable electrical performance, as measured by voltage standing wave ratio (VSWR) and insertion loss, decreased device weight and cost, and reliable and repeatable manufacturability when compared with devices formed using metals, conventional thermosetting plastics that have been metallized, and molded, plated and soldered thermoplastics.

31 Claims, 4 Drawing Sheets

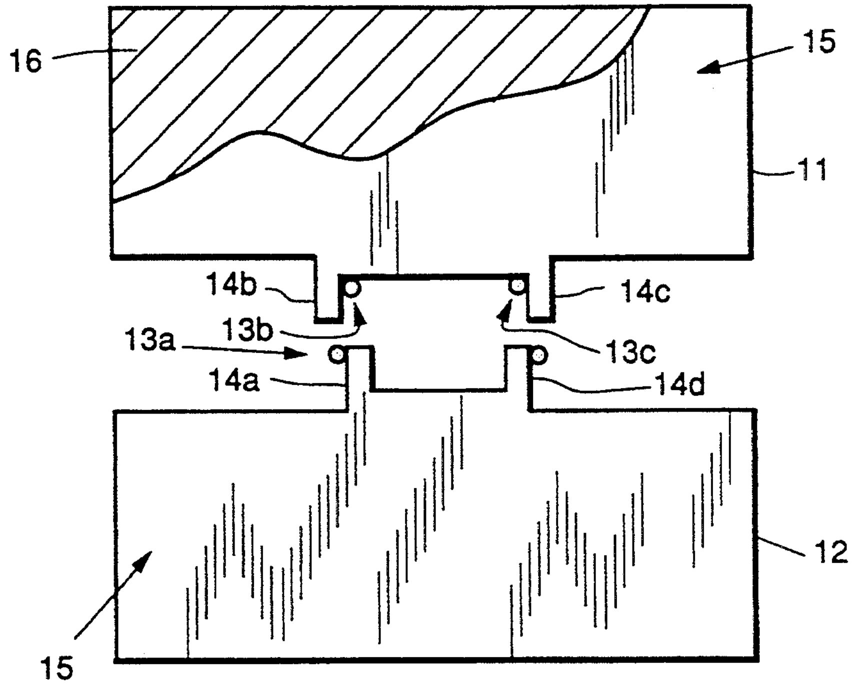
FIG. 1a.
FIG. 1b.
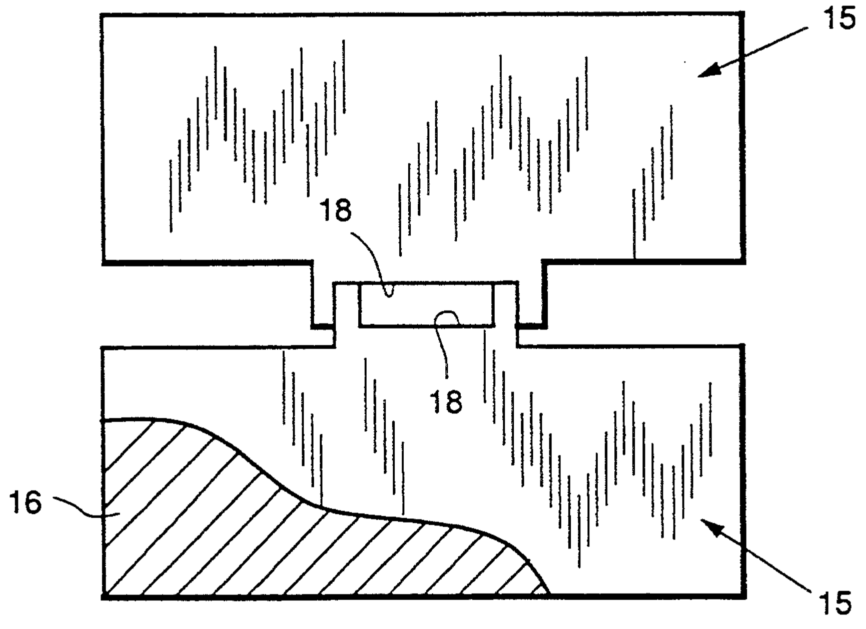

MOLDED METALLIZED PLASTIC MICROWAVE COMPONENTS AND PROCESSES FOR MANUFACTURE

This is a continuation of application Serial No. 07/880,122 filed May 7, 1992 now abandoned.

CROSS REFERENCE TO RELATED APPLICATIONS

Reference is made to U.S. Patent Application Ser. No. 07,880,123, filed May 7, 1992, for "Molded Microwave Components," which is assigned to the assignee of the present invention.

BACKGROUND

The present invention relates generally to methods of manufacturing microwave waveguide components, and more particularly, to methods of manufacturing microwave waveguide components using molded, cold machined metallized plastic.

For microwave applications, waveguides and waveguide assemblies are generally fabricated from metal. The most commonly used metallic materials are aluminum alloys (alloy numbers 1100, 6061, and 6063 per ASTM B210 and cast brazable alloys such as 712.0, 40E, and D612 per QQ-A-601), magnesium alloy (alloy AZ31B per ASTM B107), copper alloys (per ASTM B372 and MIL-S-13282), silver alloy (grade C per MIL-S-13282), silver-lined copper alloy (grade C per MIL,-S-13282), and copper-clad invar. These materials may be divided into two classes - rigid and flexible. The rigid materials are either wrought, drawn, cast, electroformed, or extruded, while the flexible materials consist of convoluted tubing. If these materials are not formed to net shape, they are either machined to shape (when all features are accessible) or broken down into individual components and joined together to form complex assemblies. Additional information regarding rigid rectangular waveguides can be found in MIL-W-85G, while rigid straight, 90 degree step twist, and 45-, 60-, and 90 degree E and H plane bend and mitered comer waveguide parameters are given in MIL-W-3970C ASTM B102 covers magnesium alloy extruded bars, rods, shapes, and tubes. Aluminum alloy drawn seamless tubes and seamless copper and copper-alloy rectangular waveguide tubes are discussed in ASTM B210 and ASTM B372, respectively. Waveguide brazing methods are given in MIL-B-7883B, while electroforming is discussed in MIL-C-14550B. It is in the fabrication of complex shapes that the disadvantages of metallic waveguides become most apparent.

For complex structures where forming or machining the metal to net shape is not possible, machining into individual components (preferably by numerically controlled cutting tools) is employed. These components can then be joined using either brazing, bending, soldering, or electron beam welding. Brazing, as described in MIL-B-7883, can be performed using either dip, furnace (also called inert gas brazing), or torch techniques; vacuum brazing may also be employed. Dip brazing is comprised of submerging the components to be joined into a molten bath of salt or flux, followed by quenching them slowly in hot water to dissolve the salt or flux. Inert gas and vacuum brazing are fluxless, expensive techniques that are performed with the components fixtured prior to heating them, in vacuum in the presence of a filler metal. The filler metal melts, forming the braze joint. Torch brazing, used primarily for joint touch-up, involves preheating the parts with a neutral or slightly reducing flame in order to liquify the filler metal. This filler metal is introduced at one site on one of the mating sun:aces only; its flow path forms the braze joint.

All of the brazing methods have the following disadvantages. Measurable part distortion occurs, and in many cases, the amount of distortion is unacceptable in terms of the degradation of the microwave component's electrical performance. The thickness of the original joints to be brazed is reduced during the brazing operation. This material loss is not a controllable variable. The heat treatment of the brazed alloy is degraded. The brazing operation can cause latent defects in brazed hardware that are joined due to residual flux or poor quality filler metal. Residual flux can result in corrosion. The use of excessive flux or filler metal can result in excessively large fillets, which can be detrimental to the microwave component's electrical performance.

When metallic components are bonded, conductive adhesives are utilized. The conductive adhesives give inferior bond strengths compared to nonconductive structural adhesives used in joining plastic parts. In addition, use of the conductive adhesive in the metallic parts can result in radio frequency (RF) and physical leakage of the final assembly, causing poor electrical performance and potentially allowing fluid entrapment in the assembly.

When metallic components are soldered together, creeping of the metal at joint locations becomes a significant problem, and leads to joints that are not structurally sound. Electron beam welding is a costly and difficult to control process for joining metallic components, and involves the "coalescence of metals by the heat obtained from a concentrated beam of high velocity electrons impinging upon the surfaces to be joined" ("Welding Handbook," Seventh Edition, Volume 3, W. H. Kearns, American Welding Society, 1980). Weld quality control using electron beam welding is more problematic than adhesive bond line control due to inherent difficulties in controlling the angle of beam incidence, evacuation time penalties, and width-to-depth ratios of the weld itself.

Accordingly, it would be an advance in the art to have a process of fabricating microwave waveguide components that provides for less costly and more producible components that achieve performance levels comparable to conventional metal waveguide components.

SUMMARY OF THE INVENTION

The present invention is an improved method for forming microwave components from plated injection molded thermoplastic and reaction injection molded thermosetting plastics compared to those devices formed using (1) metals, (2) conventional thermosetting plastics that have been metallized, and (3) molded, plated and soldered thermoplastics. In particular, the plastic devices exhibit comparable electrical performance, as measured by voltage standing wave ratio (VSWR) and insertion loss, decreased device weight and cost, and reliable and repeatable manufacturability.

The present invention provides for a method of fabricating a microwave waveguide component wherein a plurality of joinable thermoplastic members are first molded, typically by an injection molding process. The members, when joined and cold machined as required, form a microwave waveguide component having an internal surface that is platable. The thermoplastic members are then bonded together. Once bonded and machined, the internal surface is plated to form the finished microwave waveguide component.

In one specific aspect of the present invention, the method comprises electroless copper plating the component by means of the following steps. The surface of the component is prepared by immersing the component into a preselected swellent to chemically sensitize the surface, the component is etched to chemically roughen the surface, the component is rinsed in water to remove etchant residue, the component is immersed in a preselected neutralizer to stop the etching process, and the component is rinsed in water to remove neutralizer residue. The surface of the component is then catalyzed by immersing the component into a preselected catalyst preparation solution to remove excess water from the surface, the component is catalyzed using a palladium-tin colloidal solution to promote copper deposition, the component is rinsed in cold water to remove residual solution, the catalyst is activated by stripping excess tin from the catalyzed surface to expose the palladium core of the colloid particle, and the component is rinsed in cold water to remove solution residue. A thin copper layer is then deposited by immersing the pans into a copper strike solution, and rinsing the component in cold water to remove residual solution. The component is then dryed to increase copper adhesion. Finally, a thick copper layer is deposited by electroless copper plating the surface of the component to achieve a plating thickness of approximately 300 microinches, and then the component is rinsed in cold water to remove residual solution, and dried.

The thermoplastic members may comprise glass filled polyetherimide, in which case, in the surface preparation step, a second etching step comprises rinsing the component in ammonium bifluoride/sulfuric acid to remove residual glass fibers exposed during the initial etching step. Other alternative process steps may also be applied to the glass filled polyetherimide material in the above specific aspect of the present invention. For example, prior to bonding, cleaning the component with an alkaline solution instead of isopropanol. The members may be adhesively bonded (instead of solvent bonding) to form the component and then the epoxy adhesive cured for about 1 hour at about 300° F. A sodium permanganate etch and neutralizer are then used to roughen the surface instead of the chromic acid etch and neutralizer. The component is etched in (or exposed to) hydrofluoric acid to remove residual glass fibers exposed during the initial etching step. After plating, the component is then conformally coated with a low loss, fully imidized polyimide to provide corrosion protection for the copper. The component is then dried for about 1 hour at about 250° F. in a vacuum.

Utilization of the plastic forming and assembly method of the present invention in microwave devices results in marked improvements over previous approaches involving the use of metallic, conventional thermosetting, or solderable plated thermoplastic materials in terms of both fabrication and performance. Compared to metallic devices, the use of the present invention results in comparable insertion loss properties, repeatable overall electrical performance (insertion loss, VSWR, and frequency and phase response), lower manufacturing costs, decreased dimensional distortion and assembly weight, and higher process yields. In addition, due to the repeatability of the molding cycle, functional gauging may be utilized. This results in a reduction in device inspection time and cost. Compared to solderable plated thermoplastic materials, use of the present method results in simplification of the fabrication process, decreased pan distortion, and significantly increased structural integrity, dimensional control, and precision (the latter with regards to complex and/or small microwave components).

Moreover, this process is not as restrictive in terms of the polymer selection, complexity of device, rework, or the ability to perform secondary machining. Compared to conventional thermosetting materials (those which cannot be reaction injection molded), use of this invention results in faster fabrication cycles, lower costs, simplified mold design, a lower degree of operator skill in the molding process, elimination of pan inhomogeneities and voiding with less auxiliary equipment, and the ability to fabricate small, precise microwave and electronic components with more complex geometries from a larger variety of polymeric materials. In addition, the use of thermoplastics in accordance with this invention allows rework of the molded devices (through regrinding and remolding); this is not an option with the thermosets.

The use of the present method produces reliable, repeatably produced plastic microwave components with electrical performance at significant cost and weight savings comparable to state-of-the-an metallic devices. In the case of the bonded, machined, and plated waveguides fabricated in accordance with the present method, no plastic degradation and minimal distortion occurs since the bonding, cold machining, and plating operational temperatures are significantly lower than the softening temperature of the plastic. No material thickness is lost, and bondline control is not only possible but optimizable. The adhesive is nonmetallic so corrosion is not a failure mechanism for these parts. Also, since the plastic pans are bonded prior to plating, the plating serves as a bond joint seal. Furthermore, metal creeping is not a problem for the adhesively, bonded plastic parts since a structural bond is formed.

In particular, for one particular antenna type made by the assignee of the present invention, the use of of injection molded, adhesively bonded, cold machined, and plated waveguide feed networks and interconnecting waveguides is estimated to save a minimum of $650,000 per antenna over a comparable metal antenna. The weight savings gained by substituting plastic devices for metallic devices in this antenna is estimated to be 35%. This invention can be used for both military and commercial applications. It can be utilized in airborne, shipborne, and ground-based radars, antennas (reflectors and planar arrays), radomes, heads-up displays, stripline devices, radiators (dipole, flared notch, loop, helix, patch, and slot), circulators, waveguide assemblies, power dividers, feed networks (both corporate and travelling wave), multiplexers, and squarax and coax waveguides.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 1A and 1B show the fabrication of a reduced Ku-band straight section of waveguide using a method in accordance with the principles of the present invention;

DETAILED DESCRIPTION

Figure 2:
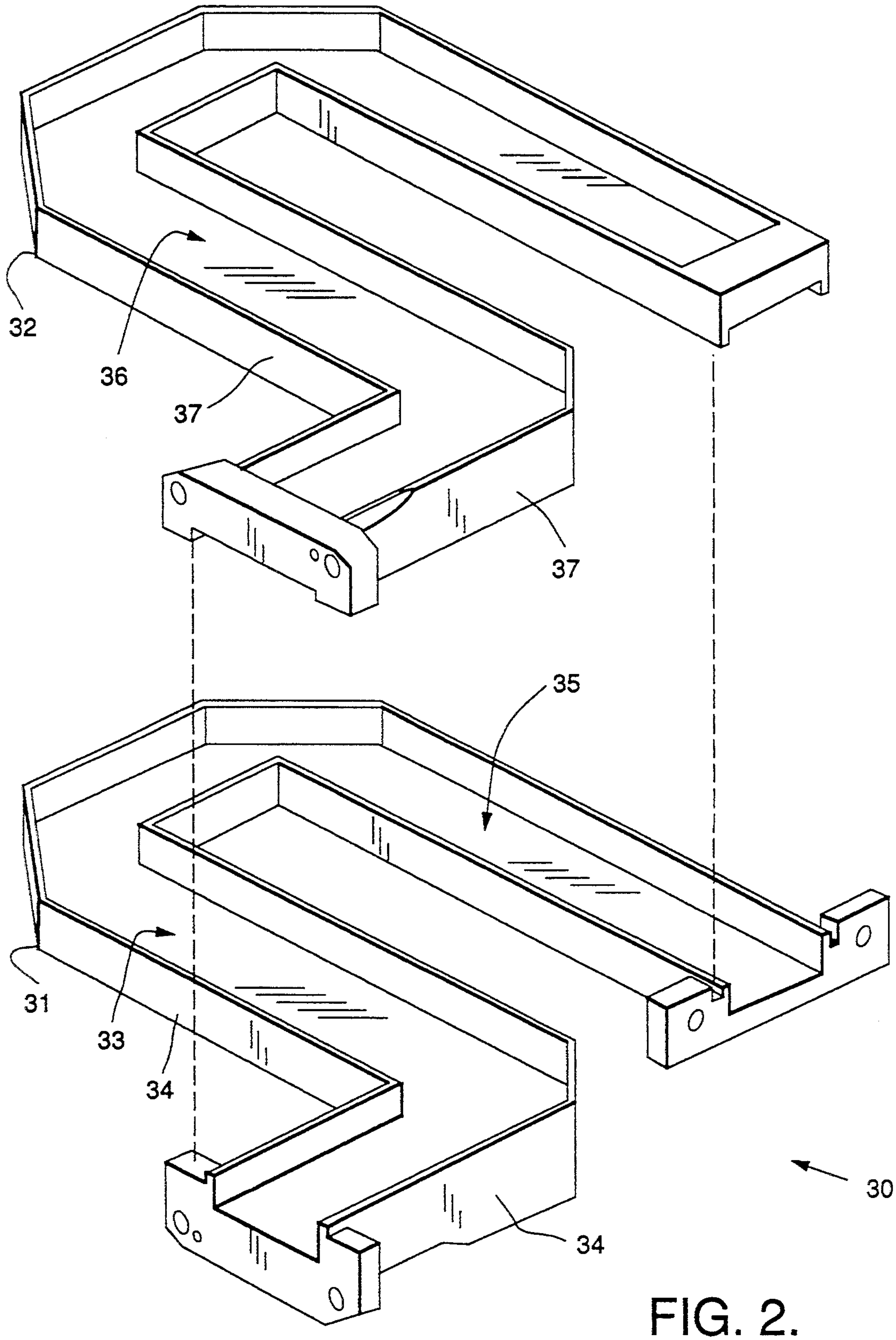
FIG. 2 shows a molded interconnecting waveguide assembly made in accordance with the principles of the present invention.

The present invention comprises a method for forming lightweight microwave components that exhibit excellent electrical performance, low distortion, and reliable and repeatable ,manufacturability from plated injection molded thermoplastic and reaction injection molded thermosetting materials. The following examples are illustrative of the many aspects and advantages of the present invention, and are not to be considered limiting as to the scope of the invention.

EXAMPLE 1

This example details the fabrication of reduced Ku-band straight waveguide sections 11, 12 with inside dimensions of 0.510″×0.083″×6.0″ using modified polyphenylene oxide (Noryl PN235, obtainable from General Electric Company, Plastics Division), as is shown in FIG. 1A. The two waveguide section 11, 12, when mated, form a microwave waveguide 10. The waveguide sections 11, 12 are machined to the configuration shown in FIG. 1A from a one-half inch thick injection molded sheet of a unreinforced "platable" grade of Noryl. Preferably, the waveguide sections 11, 12 are injection molded to net shape with a glass reinforced grade, such as Noryl GFN30. Prior to solvent bonding, mating surfaces 13*a*–13*d* are lightly abraded with 400 grit sandpaper, followed by an isopropanol rinse to remove residual particulates. The mating surfaces 13*a*–13*d* are solvent bonded using methylene chloride applied to waveguide ridges 14*a*–14*d* as is represented by the small circles in FIG. 1A. Alternatively, the waveguide sections 11, 12 may be joined using adhesive or ultrasonic bonding. After fixturing, the waveguide sections 11, 12 are air dried for about 72 hours in order to allow for residual solvent evaporation. The waveguide sections 11, 12 are then removed from the fixturing, cold machined to produce flat flange faces 15, and plated with electroless copper 16 on all exposed surfaces.

Copper was selected as the metal to be deposited due to its high conductivity characteristic. Electroless plating comprises "the deposition of a metallic coating by a controlled chemical reduction which is catalyzed by the metal or alloy being deposited" as is discussed in the Electroplating Engineering Handbook, Third Edition, edited by A. Kenneth Graham, Van Nostrand Reinhold and Company, 1971. Electroless or catalytic copper plating was selected instead of electrolytic copper plating to insure uniform metallization of interior waveguide surfaces 18. Electrolytic plating or electroplating is comprised of "the electrodeposition of an adherent metallic coating upon an electrode for the purpose of securing a surface with properties or dimensions different from those of the base metal," as is defined in the above-cited handbook. If electrolytic plating had been used, metal deposition thickness would not be uniform since plating current concentration at projections and edges results in thinner depositions in recessed areas. Given the difficulty of fabrication and use of miniature electrodes within the waveguide 10, this approach to electroplating would not guarantee deposition uniformity either. Electrode placement is of particular concern as the internal cavities become progressively smaller.

The electroless plating process is comprised of four steps: surface preparation, surface catalysis, thin copper deposition, and thick copper deposition. The surface preparation steps are performed on the Noryl waveguides 10 of FIG. 1 as follows. (1) Immerse the waveguides into a swellent specific for chromic acid etch (Hydrolyzer PM 940-7, available/Yom Shipley Company, Inc.) to chemically sensitize the surface. (2) Chromic acid etch (PM 940-7 Etch, available from Shipley) in order to chemically roughen the surface. (3) Cold water rinse to remove etchant residue. (4) Immerse in the chromic acid neutralizer (Shipley EMC-1554 with a 1% cleaner-conditioner EMC-1518A) to stop the etching process. (5) Cold water rinse to remove the neutralizer residue.

The surface catalysis steps are as follows. (1) Immerse the parts in a catalyst preparation solution (Shipley Cataprep 404) in order to remove excess water from the surface of the plastic to prevent drag-in and dilution of the catalyst solution. (2) Catalyze using a palladium-tin colloidal solution (Shipley Cataposit 44) to promote copper deposition. (3) Cold water rinse to remove residual solution. (4) Activate the catalyst by stripping excess tin from the catalyzed surface to expose the palladium core of the colloid particle (Shipley Accelerator 241). (5) Cold water rinse to remove solution residues.

Thin copper deposition is accomplished by immersing the parts into a copper strike solution (Shipley Electroless Copper 994). The copper strike serves the following three purposes. (1) As the initial metal deposition, it serves as drag-out protection for the more expensive high "throw" electroless copper. (2) It provides a smooth or level surface as a basis for subsequent plating. (3) Bath control and plating initiation is easier than for the high "throw" bath. The copper strike is then followed by a double cold water rinse to remove residual solution prior to the heavy deposition of copper. It is at this stage in the plating process and/or after the high "throw" copper that either an ambient temperature dry or elevated temperature bake of the parts may be performed to increase copper adhesion.

High "throw" or heavy deposition electroless copper plating is then performed (Shipley XP 8835) to achieve a plating thickness of approximately 300 microinches. The final operations are a double cold water rinse to remove solution residues, followed by an air dry.

In addition, two other straight sections of waveguide (not shown) having the exact same dimensions as the Noryl waveguide sections 11, 12 were machined from 6061 aluminum, joined by dip brazing, and finish machined to provide fiat flange faces. All three of these parts were electrically tested using a Hewlett-Packard 8510A Automatic Network Analyzer, a bench set-up comprised of coaxial cables, transitions from coaxial cables to standard Ku-band waveguide, and a set of waveguide tapers that gradually taper the waveguide from the inside dimension of 0.622″×0.311″ to 0.510″×0.083″. The Automatic Network Analyzer measures the S-parameters of the microwave component.

The S-parameters are the scattering-matrix parameters of the device under test, in our case, the waveguide 10. Since each of the S-parameters are vector quantities, they are described by both an amplitude and a phase. S11 is the vector defined as the reflection coefficient, which is the amount of RF input energy that is reflected when injecting a known quantity of RF energy into the device under test. S22 is the reflection coefficient for port 2. The reflection coefficient is alternatively expressed in terms of the voltage standing wave ratio (VSWR), a scalar quantity, which is given by $VSWR=[(1+|S11|)\div(1-|S11|)]$. When there is no reflection (S11=0), the VSWR=1.0, which is the theoretically perfect case. As the VSWR becomes larger than 1.0, the electrical performance is considered degraded, since not all the available input power enters the device.

S21 is the transmission coefficient. It measures the amount of energy (amplitude and phase), delivered to port 2, relative to the available input energy. Thus, it is a measure of the amount of energy lost through the device due to reflected energy, VSWR, and attenuation due to finite conductivity. S12 is the reciprocal transmission coefficient of S21. The transmission coefficient is often expressed in scalar form as insertion loss and is defined as $10\times\log_{10}[1/|S21|^2]$. If all the energy passes through the device, none is reflected and none is lost to finite conductivity, then |S21| equals 1.0, and the insertion loss is 0.0 dB. This is the theoretically perfect case and as the insertion loss increases, the electrical performance degrades.

Measured data shows that one of the two plated plastic waveguides had electrical performance superior to that of the dip brazed ,aluminum waveguide having the same dimensions. The VSWR of the aluminum waveguide at a particular frequency (#10 of the data) was 1.0165 for port 1 and 1.035 for port 2, while the good plastic waveguide 10 had a VSWR of 1.015 for port 1 and 1.023 for port 2. The insertion loss of the aluminum waveguide alone, subtracting out the loss due to the system used to measure the waveguide, was 0.1733 dB, while the plastic waveguide 10 was 0.10211 dB. One plastic waveguide 10 that was not completely plated on all internal surfaces, did not perform well. The one plastic waveguide 10 had a VSWR of 3.08 for port 1, 1.568 for port 2, and an insertion loss of 21.0 dB.

EXAMPLE 2

This example describes the fabrication of eight Ultem 2300 (30% glass filled polyetherimide, available from General Electric Company, Plastics Division) waveguides 10 of similar configuration as described in Example 1 with Me exception that the waveguide length was 12.0 inches instead of 6.0 inches. All of the processing was the same with the exception of four specific steps of the plating procedure. Shipley 8831, a proprietary solvent solution developed for Ultem sensitization, was used instead of the Hydrolyzer PM 940-7. An ammonium bifluoride/sulfuric acid glass etch was used to remove residual glass fibers exposed during the chromic acid etch; this was not done in Example 1 since Noryl PN235 is untilled. Accelerator 19 and electroless copper 328 were used instead of Accelerator 241 and 994 copper, respectively; they are essentially interchangeable materials.

Electrical testing was performed as given in Example 1. Only one of these eight waveguides 10 had acceptable electrical performance and the failures were attributed to the poor quality of the solvent bond. For comparison, an aluminum waveguide having the exact same dimensions was machined, dip brazed, and measured with the eight plastic waveguides 10. The measured data shows that the one good plastic waveguide had a VSWR of 1.13 for both ports 1 and 2 and an insertion loss of 0.292 dB, while the aluminum waveguide had VSWR's of 1.11 and 1.13 for ports 1 and 2, respectively, and an insertion loss of 0.304 dB. The remainder of the seven plastic wave,guides had VSWR's which varied from 1.12 to 1.96 and insertion losses between 1.43 and 33.9 dB. The first two of these waveguides were typical for this lot with respect to electrical performance, having VSWR's of 1.18 and 1.62, respectively, with insertion losses of 11.64 dB and 5.57 dB, respectively. These two waveguides were then stripped of their copper metallization, replated using the process previously described in this example, and remeasured electrically. They both improved significantly, giving acceptable electrical performance. One of the replated waveguides 10 had VSWR's of 1.122 and 1.10 at ports 1 and 2, respectively, and an insertion loss of 0.368 dB. The other of the replated waveguides 10 performed with VSWR's of 1.122 and 1.117 at ports 1 and 2, respectively, and an insertion loss of 0.334 dB.

EXAMPLE 3

This example details the fabrication of injection molded Ultem 2300 interconnecting waveguides is shown in FIG. 2. More particularly, FIG. 2 shows a molded interconnecting waveguide assembly 30 made in accordance with the principles of the present invention. Four configurations of a 6 inch long, H-plane bend interconnecting waveguide assembly 30 shown in FIG. 2 are utilized. The interconnecting waveguide assembly 30 comprises two halves of this configuration, and includes a base 31 and a cover 32. The base 31 is shown as a U-shaped member having a sidewall 33 and a plurality of edgewalls 34 contacting the sidewall 33 to form a U-shaped cavity 35. The cover 32 is also shown as a U-shaped member that is adapted to mate with the base 31, and has a sidewall 36 and a plurality of edgewalls 37 contacting the sidewall 36.

The processing associated with molded interconnecting waveguide assembly 30 is identical to that of Example 2 with the following exceptions. (1) The base 31 and cover 32 are cleaned prior to bonding with an alkaline solution (Oakite 166, available from Oakite Products, Inc.) rather than with isopropanol. (2) The base 31 and cover 32 are adhesively bonded (to provide more uniform bond joints than that obtained from solvent bonding) using Hysol Dexter Corporation EA 9459 (a one-part epoxy adhesive that, when cured, is inert with respect to attack by the plating chemicals), fixtured and cured 1 hour at about 300° F. (3) The waveguide assembly 30 is fixtured and finished cold machined before plating. (4) The plating process uses a sodium permanganate etch and neutralizer (Enthone CDE-1000 etch and neutralizer) rather than a chromic acid etch (the former is in compliance with current environmental restrictions, while the latter is not) and hydrofluoric acid rather than ammonium bifluoride/sulfuric acid as the glass etch (both give similar results). (5) The exterior of the waveguide assembly 30 is conformally coated after plating (in order to provide corrosion protection for the copper) with a low loss, fully imidized polyimide (E.I. DuPont Pyralin PI 2590D), and dried for about 1 hour at about 250° F. under vacuum.

Tremendous success with respect to the electrical performance was experienced with these microwave waveguide assemblies 30 using the process described in this example. Typical electrical performance yields of three out of the four configurations to a specification of 1.21 VSWR and insertion loss of 0.15 dB are: 2 fail/34 total, 0 fail/32 total, and 2 fail/30 total. The fourth configuration was found to be dimensionally different from its aluminum counterpart, which accounted for a degraded performance with respect to VSWR. The yield on that configuration was 20 fail/29 total; each failure was due to the VSWR as expected. Not one single failure was attributable to insertion loss for this configuration.

EXAMPLE 4

Figure 3:
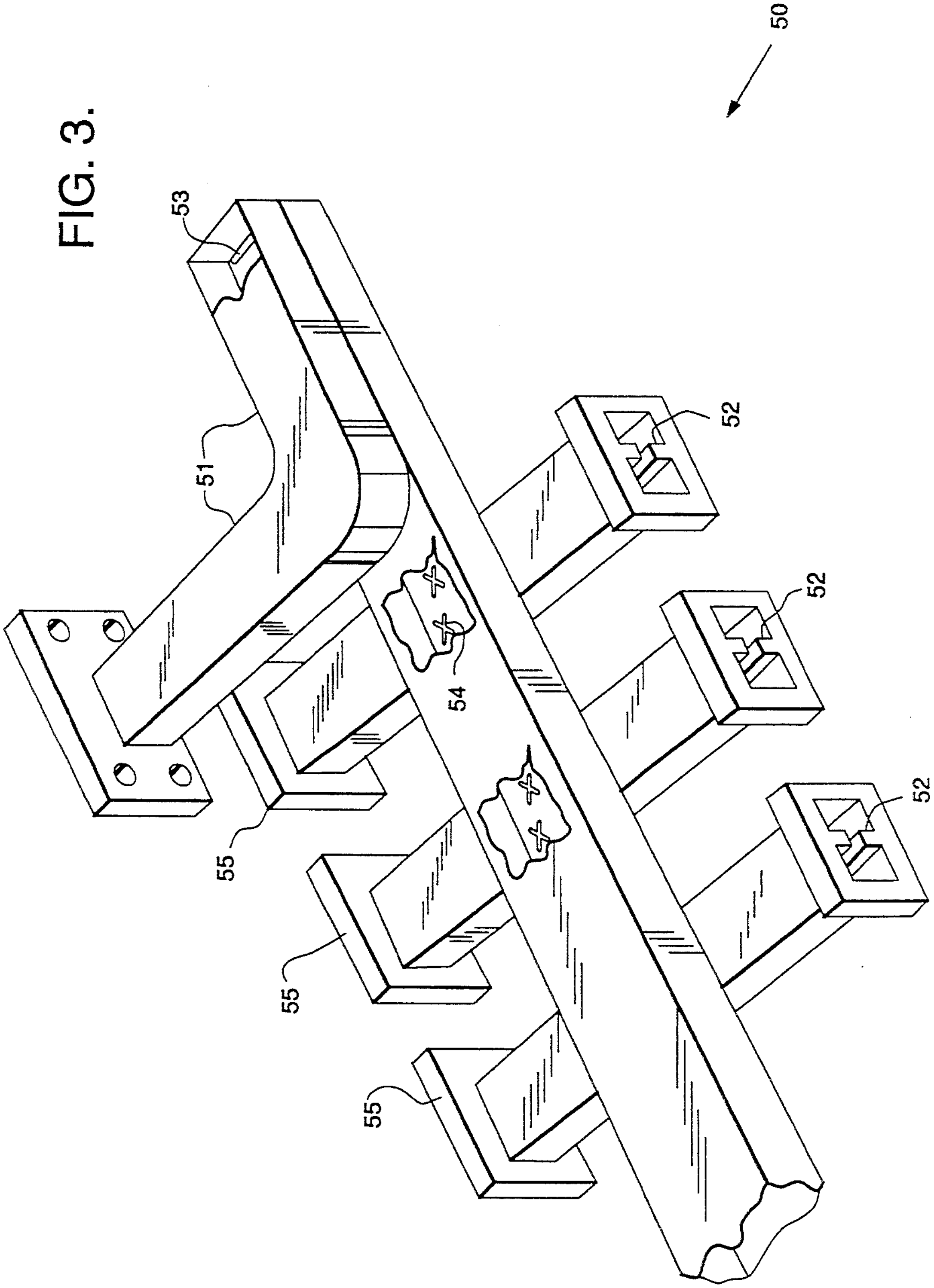
FIG. 3 shows a reduced height, ridge loaded, Ku-band travelling wave power distribution network, fabricated by assembling four injection molded sections of plastic in accordance with the principles of the present invention.

This example describes the fabrication of a reduced height, ridge loaded, Ku-band travelling wave power distribution network 50, or feed 50, fabricated by assembling four injection molded and machined sections of Ultem 2300 as shown in FIG. 3. This feed network 50 is a very complicated microwave device with an H-plane bends 51, transformers 52, E-plane bends 53 (folded slot), directional couplers 54, and ridge loaded waveguides 55. The dimensional tolerances are small for most of the components of this Ku-band travelling wave feed 50 and are consistently achieved with the use of the disclosed injection molded, bonded, and plated components fabricated in accordance with the principles of the present invention. All of the individual sections were cleaned with Oakite 166 and joined with Hysol EA 9459 after coupling slots are machined; the processing was identical to that described in Example 3.

The electrical performance of each feed is based on the measured S parameters of each port in the network 50. The first run of the plastic feeds 50 yielded the following results: 64% satisfactory, 30% marginal, and 6% failed. A comparative feed (not shown) was produced by dip brazing an assembly of machined 6061 aluminum pans. Over 2000 aluminum feeds have been produced over the past seven years. The yield for the untuned aluminum feeds was approximately 48% satisfactory, 47% marginal, and 5% failed. Special tuning techniques that were time and labor intensive were developed to improve the yield to approximately 58% satisfactory, 37% marginal, and 5% failed. The plated plastic feeds 50 required no special tuning or other time consuming measures to improve their electrical performance; from that perspective, this represents a significant cost and schedule savings. Moreover, since this was the first run of the plated plastic feeds 50 and several problems were uncovered during this phase, the yield on these feeds 50 is expected to improve considerably with time.

EXAMPLE 5

Figure 4:
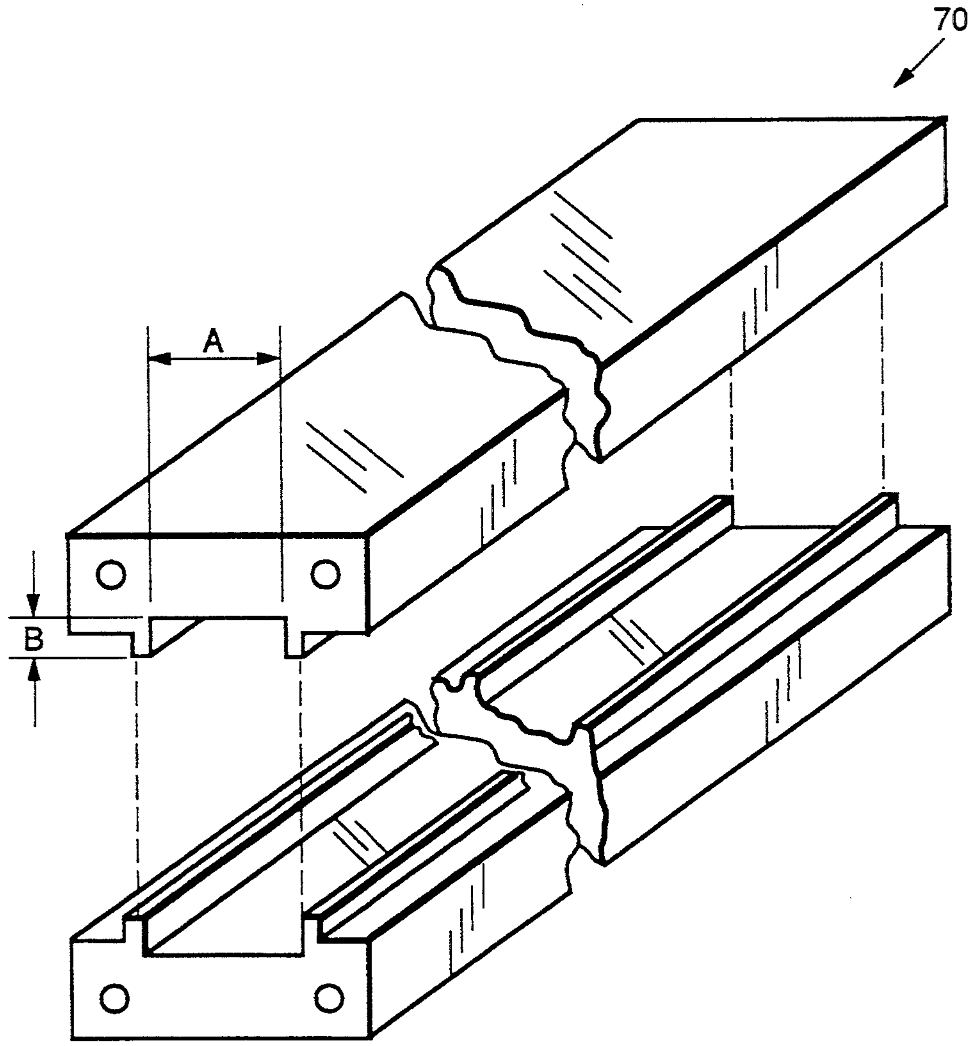
FIG. 4 shows a portion of a molded interconnecting waveguide assembly having reduced dimensions made in accordance with the principles of the present invention.

This example describes the fabrication of devices discussed in Example 2, with the exception that the waveguide dimensions are appropriate for other microwave bands. More particularly, FIG. 4 shows a portion of a molded interconnecting waveguide assembly having reduced dimensions made in accordance with the principles of the present invention. These dimensions are given in Table 1 below. The fabrication techniques are the same as those given in Example 4. Since the Ku-band devices mentioned in the previous examples resulted in comparable to superior electrical performance when compared to the same devices in metal, the expected test results of similar microwave components at lower frequencies would be the same or better. The method of the present invention may be applied to lower frequencies (X-band or C-band, for example) with similar results because dimensional tolerances are less critical at the lower frequencies. In addition, any distortion in the microwave waveguide assembly 70 caused by the process has a much larger effect on the electrical performance at a high frequency such as Ku-band. Since no detrimental effects on the electrical performance due to distortion were noticed at Ku-band, it is expected that the electrical performance of a microwave waveguide assembly 70 at any lower frequency, fabricated using the method described herein, is expected to be excellent.

TABLE 1

| Waveguide size | Dimension A | Dimension B |
|---|---|---|
| Reduced Ku-band | 0.50 | 0.083 |
| Ku-band | 0.622 | 0.311 |
| X-band | 0.900 | 0.400 |
| C-band | 1.872 | 0.872 |

EXAMPLE 6

This example describes the fabrication of devices discussed in Example 5, with the exception that the waveguides am fabricated with fiber reinforced thermosetting plastics using reaction injection molding (RIM). Suitable thermoplastics include, but are not limited to, phenolics, epoxies, 1,2-polybutadienes, and diallyl phthalate (DAP). While polyester bulk molding compound (BMC), melamine, urea, and vinyl ester resins are commonly reaction injection molded, their lower thermal stabilities would require additional processing variations in the metallization step. Suitable reinforcement would include glass, graphite, ceramic, and Kevlar fibers. The incorporation of common RIM fillers (such as clay, carbon black, wood fibers, kaolin, calcium carbonate, talc, and silica) should be minimized to retain structural integrity of the resulting waveguides.

Processing of the RIM waveguides would be the same as in Example 4, with the following two exceptions: (1) deflashing of the as-molded parts; and (2) a choice in the surface preparation steps used in the plating procedure. Deflashing of RIM parts, frequently needed due to the lower viscosity of the thermosetting polymer allows material to flow into the parting line, is usually accomplished by tumbling or exposure to high speed plastic pellets (Modem Plastics Encyclopedia '91, Rosalind Juran, editor, McGraw Hill, 1990). To achieve adequate surface preparation of the (epoxy) bonded waveguide assembly in the plating step, either a chromic acid or sodium/potassium permanganate etch could be used; the particular swellents and neutralizers appropriate to the selected etch would then be utilized. A glass etch would be implemented only if the molding compound contained glass as a reinforcement.

Since a thermoset would be used in place of a thermoplastic in the fabrication of microwave components, it is expected that increased dimensional tolerances would be obtainable, since the cross-linked plastic will not creep This dimensional stability is achieved at the expense of molding rate, since thermoset molding time is longer than that for a thermoplastic to allow for material curing, and, potentially, material "breathing" (where the mold is briefly opened during the cycle for gas venting). It is expected that the electrical performance of the resulting RIM microwave component, fabricated using the process described herein, would be excellent.

Thus there has been described new and improved plastic waveguide components and methods of manufacturing waveguide components that are fabricated using molded, metallized thermoplastic. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method of fabricating a microwave waveguide component that is capable of transmitting microwave energy, said method comprising the steps of:

forming a plurality of joinable thermoplastic members, which when joined, form a microwave waveguide component having an internal surface;

bonding the plurality of joinable thermoplastic members together after said step of forming a plurality of joinable thermoplastic members to form the microwave waveguide component having the internal surface; and plating the internal surface after step of bonding the plurality of joinable thermoplastic members together to form the microwave waveguide component that is capable of transmitting microwave energy.

2. The method of claim 1 wherein the forming step comprises the steps of extruding the plurality of joinable thermoplastic members and machining the members to a desired shape.

3. The method of claim 1 wherein the forming step comprises the step of injection molding the plurality of joinable thermoplastic members.

4. The method of claim 3 wherein the plurality of joinable thermoplastic members are reinforced using a material from the group comprised of glass, graphite, ceramic and Kevlar fibers.

5. The method of claim 1 wherein the forming step comprises the steps of injection molding the plurality of joinable thermoplastic members and machining the members to a desired shape.

6. The method of claim 1 wherein the bonding step comprises the step of solvent bonding the plurality of joinable thermoplastic members together.

7. The method of claim 6 which comprises the step of solvent bonding the plurality of joinable thermoplastic members together using methylene chloride.

8. The method of claim 1 which further comprises the steps of:

prior to the bonding step, lightly abrading all mating surfaces and rinsing the abraded surfaces with isopropanol to remove residual particulates.

9. The method of claim 1 wherein the bonding step comprises the step of adhesively bonding the plurality of joinable thermoplastic members together.

10. The method of claim 1 wherein the bonding step comprises the step of ultrasonically bonding the plurality of joinable thermoplastic members together.

11. The method of claim 1 wherein the forming step comprises the step of reaction injection molding the plurality of joinable thermoplastic members using fiber reinforced thermosetting plastics.

12. The method of claim 11 wherein the fiber reinforced thermosetting plastics are selected from the group comprised of phenolics, epoxies, 1,2-polybutadienes, and diallyl phthalate.

13. The method of claim 12 wherein the fiber reinforced thermosetting plastics are reinforced using a material from the group comprised of glass, graphite, ceramic, and Kevlar fibers.

14. The method of claim 11 wherein the fiber reinforced thermosetting plastics are selected from the group comprised of polyester bulk molding compound, urea, melamine, and vinyl ester resin.

15. The method of claim 14 wherein the fiber reinforced thermosetting plastics are reinforced using a material from the group comprised of glass, graphite, ceramic, and Kevlar fibers.

16. A method of fabricating a microwave waveguide component that is capable of transmitting microwave energy, said method comprising the steps of:

forming a plurality of joinable thermoplastic members, which when joined, form a microwave waveguide component having an internal surface;

bonding the plurality of joinable thermoplastic members together to form the microwave waveguide component having the internal surface; electroless copper plating the internal surface to form the microwave waveguide component that is capable of transmitting microwave energy, which comprises molding a plurality of joinable thermoplastic members comprising glass filled polyetherimide, the method further comprising the steps of:

prior to bonding, cleaning the component with an alkaline solution;

adhesively bonding the members to form the component and curing the bonded component for about 1 hour at about 300° F.;

etching the surface using a sodium permanganate etch and neutralizer;

etching the component in hydrofluoric acid to remove residual glass fibers exposed during the initial etching step;

plating the component;

conformally coating the component after plating with a low loss, fully imidized polyimide to provide corrosion protection for the copper; and drying the component for about 1 hour at about 250° F. in a vacuum.

17. The method of claim 16 wherein the forming step comprises the step of reaction injection molding the plurality of joinable thermoplastic members using fiber reinforced thermosetting plastics.

18. The method of claim 17 wherein the fiber reinforced thermosetting plastics are selected from the group comprised of phenolics, epoxies, 1,2-polybutadienes, and diallyl phthalate.

19. The method of claim 17 wherein the fiber reinforced thermosetting plastics are selected from the group comprised of polyester bulk molding compound, urea, melamine, and vinyl ester resin.

20. The method of claim 19 wherein the fiber reinforced thermosetting plastics are reinforced using a material from the group comprised of glass, graphite, ceramic, and Kevlar fibers.

21. The method of claim 20 wherein the fiber reinforced thermosetting plastics are reinfrced using amerial from the group comprised of glass, graphite, ceramic, and Kevlar fibers.

22. The method of claim 16 wherein the forming step comprises the steps of extruding the plurality of joinable thermoplastic members and machining the members to a desired shape.

23. The method of claim 16 wherein the forming step comprises the step of injection molding the plurality of joinable thermoplastic members.

24. The method of claim 23 wherein the plurality of joinable thermoplastic members are reinforced using a material from the group comprised of glass, graphite, ceramic and Kevlar fibers.

25. The method of claim 16 wherein the forming step comprises the steps of injection molding the plurality of joinable thermoplastic members and machining the members to a desired shape.

26. The method of claim 16 wherein the bonding step comprises the step of solvent bonding the plurality of joinable thermoplastic members together.

27. The method of claim 26 which comprises the step of solvent bonding the plurality of joinable thermoplastic members together usinging methylene chloride.

28. The method of claim 16 which further comprises the steps of:

prior to the bonding step, lightly abrading all mating surfaces and rinsing the abraded surfaces with isopropanol to remove resdual particulates.

29. The method of claim 16 wherein the electroless copper plating step comprises the steps:

(1) preparinng the surface of the component by immersing the component into a preselected swellent to chemically sensitize the surface; etching the component to chemically roughen the surface; rinsing the component in cold water to remove etchint residue; immersing the component in a preselected neutralizer to stop the etching process; and rinsing the component in cold water to remove neutralizer residue;

(2) catalyzing the surface of the component by immersing the component into a preselected catalyst preparation soluton to remove excess water from the surface; catalyzing the component using a palladium-tin colloidal sollution to promote copper despoition; rinsing the component in cold water to remove residual soluton; activating the catalyst by stripping excess tin from the catalyzed surface to expose the palladium core of the colloid particle; and rinsing the component in cold water to remove solutoin residue;

(3) depositing a thin copper layer by immersing the parts into a cooper strike solution; and rinsing the compoentn in cold water to remove residual solution;

(4) drying the component to increase copper adhesion; and (5) depositing a thick copper layer by electroless copper plating the surface of the component to achieve a plating thickness of approximately 300 microinches; rinsing the component in cold water to remove residual solution;and drying the component.

30. The method of claim 16 which comprises molding a plurality fo joinable thermoplastic members comprising glass filled polyetherimide, and wherein, in the step of preparing the surface of the compoent, the step of rinsing the component to remove neutralizer resideu is folowe by the step of:

etching the component in ammonium bifluoride/sulfuric acid to remove residual glass fibers exposed during the initial etching step.

31. A method of fabricating a microwave waveguide component that is capable of transmitting microwave energy, said method comprising the steps of:

forming a plurality of joinable thermoplastic members, which when joined, form a microwave waveguide component having an internal surface;

bonding the plurality of joinable thermoplastic members together to form the microwave waveguide component having the internal surface; and electroless copper plating the internal surface to form the microwave waveguide component that is capable of transmitting microwave; energy, comprising the steps of:

(1) preparing the surface of the component by immersing the component into a preselected swellent to chemically sensitize the surface; etching the component to chemically roughen the surface; rinsing the component in cold water to remove etchant reisue; immersing the component in a preselected neutralizer to stop the etching process; rinsing the component in cold water to remove neutralizer residue; and etching the component in ammonium bifluoride/sulfuric acid to remove residual glass fibers exposed during the initial etching step;

(2) catalyzing the surface of the component by immersing the component into a preselected catalyst preparation solution to remove excess water from the surface; catalyzing the component using a palladuim-tin collodial solution to promote copper deposition; rinisng the component in cold water to remove residual solution; activating the catalyst by stripping excess tin from the catalyzed surface; and rinsing the component in cold water to remove solution residue;

(3) depositing a thin copper layer by immersing the parts into a copper strike solution; and rinsing the component in cold water to remove residual solution;

(4) drying the component to increase copper adhesion; and (5) depositing a thick coppper layer by electroless copper plating the surface of the component to acheieve a plating thickness of approximately 300 microinches; rinsing the component in cold water to remove residual solution; and drying the component.

* * * * *